United States Patent
Garcia et al.

(10) Patent No.: US 9,458,916 B2
(45) Date of Patent: Oct. 4, 2016

(54) GUIDE PIN ASSEMBLY

(71) Applicant: GM Global Technology Operations LLC, Detroit, MI (US)

(72) Inventors: Pete R. Garcia, Madison Heights, MI (US); Bradford E. Vorbeck, Waterford, MI (US); Dan Coffey, Howell, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/665,675

(22) Filed: Mar. 23, 2015

(65) Prior Publication Data

US 2016/0040762 A1    Feb. 11, 2016

Related U.S. Application Data

(60) Provisional application No. 62/034,873, filed on Aug. 8, 2014.

(51) Int. Cl.
| | |
|---|---|
| *F16H 57/04* | (2010.01) |
| *F16H 7/18* | (2006.01) |
| *F16H 9/24* | (2006.01) |
| *F16H 57/05* | (2006.01) |

(52) U.S. Cl.
CPC ... *F16H 9/24* (2013.01); *F16H 7/18* (2013.01); *F16H 57/042* (2013.01); *F16H 57/05* (2013.01)

(58) Field of Classification Search
CPC ...... F16H 7/18; F16H 9/18; F16H 2007/185; F16H 57/023; F16H 57/0456

USPC .................................................. 474/140, 91
See application file for complete search history.

(56) References Cited

U.S. PATENT DOCUMENTS

| | | | | |
|---|---|---|---|---|
| 4,864,708 A | * | 9/1989 | Stapleton | B25B 27/0035 29/213.1 |
| 6,435,994 B1 | * | 8/2002 | Friedmann | F16H 7/18 474/111 |
| 7,354,364 B2 | * | 4/2008 | Glas | F16H 59/36 474/140 |
| 8,057,336 B2 | * | 11/2011 | Wodtke | F16H 7/18 474/111 |
| 8,376,883 B2 | * | 2/2013 | Inoue | F16H 9/24 474/109 |
| 2005/0277500 A1 | * | 12/2005 | Bitzer | F16H 57/0489 474/1 |
| 2007/0190830 A1 | * | 8/2007 | Wodtke | F16H 7/18 439/153 |
| 2008/0176692 A1 | * | 7/2008 | Teubert | F16H 9/18 474/206 |
| 2011/0244999 A1 | * | 10/2011 | Nakamura | F16H 9/18 474/91 |
| 2014/0235390 A1 | * | 8/2014 | Urbanek | F16H 7/18 474/140 |
| 2015/0176684 A1 | * | 6/2015 | Werny | F16H 7/18 474/140 |

* cited by examiner

*Primary Examiner* — Henry Liu

(57) ABSTRACT

A guide pin assembly for a CVT variator includes a retainer and a guide pin coupled to the retainer. The retainer provides at least three functions for the guide pin: pilot, orientation and retention. The guide pin provides lateral and axial constraints to a chain guide through which a chain extends.

16 Claims, 5 Drawing Sheets

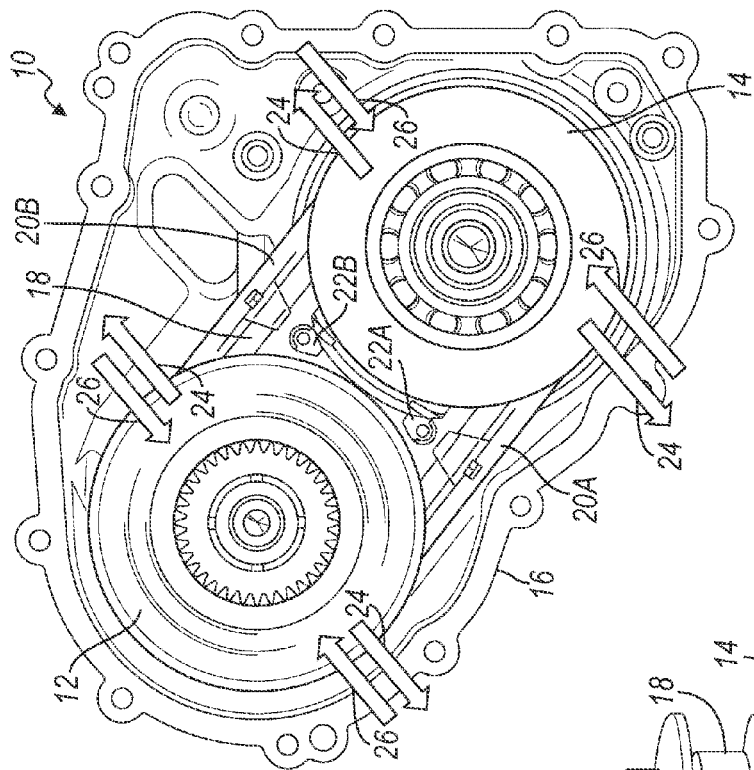
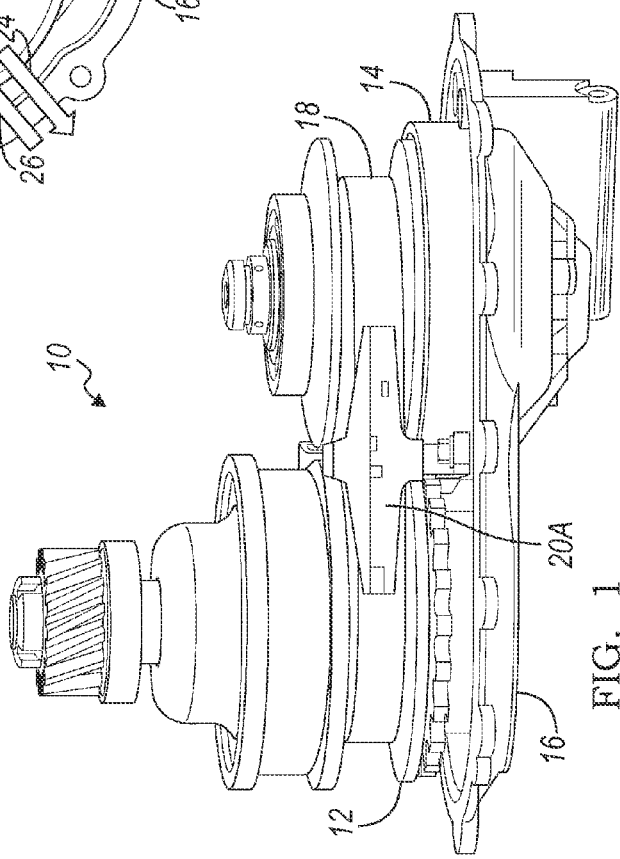
FIG. 2A
FIG. 1

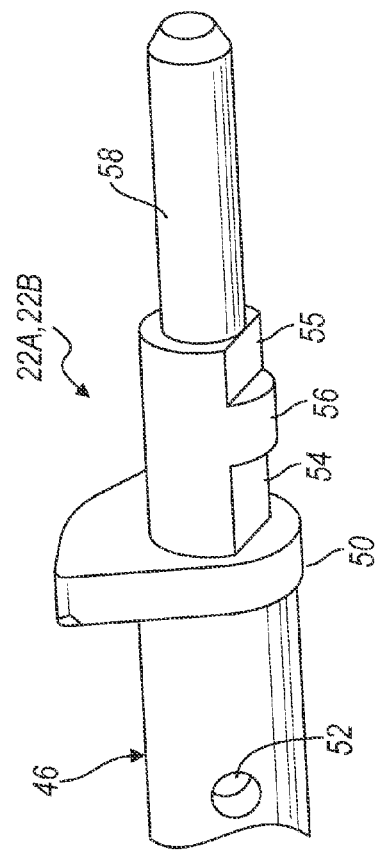
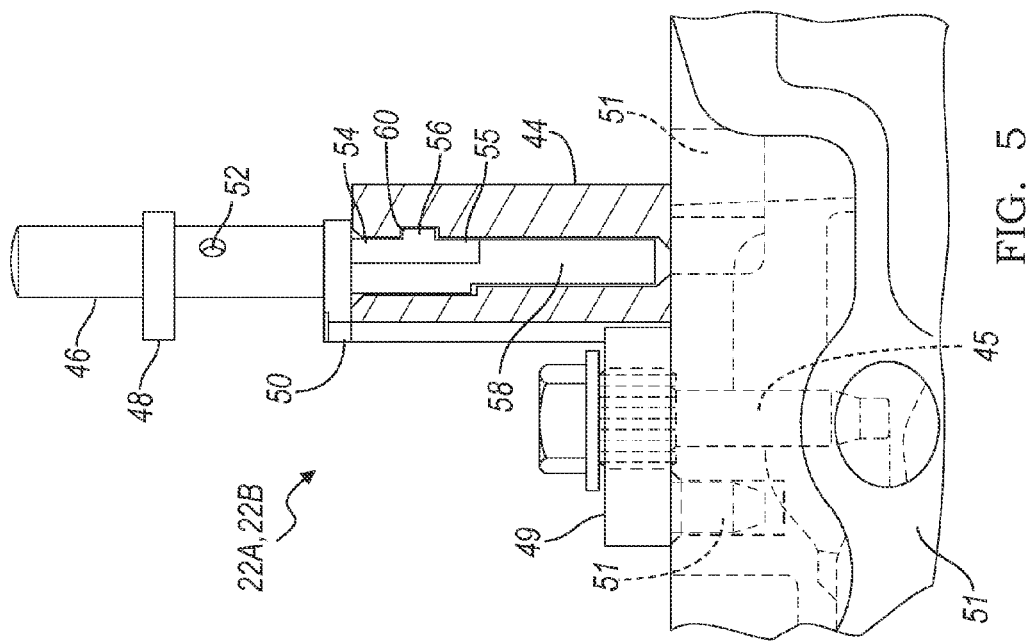

GUIDE PIN ASSEMBLY

RELATED APPLICATION

This application claims the benefit of U.S. Provisional Patent Application No. 62/034,873, filed on Aug. 8, 2014, the entire contents of which are incorporated herein by reference.

FIELD

The present disclosure relates to continuously variable transmissions. More specifically, the present disclosure relates to a guide pin assembly for continuously variable transmissions.

BACKGROUND

The statements in this section merely provide background information related to the present disclosure and may or may not constitute prior art.

Many modern motor vehicle automatic continuously variable transmissions (CVT) utilize chain and pulleys to achieve a desired gear ratio. The CVT chain drive is an advancement in automatic transmissions that provide increased efficiency and robustness. To reduce noise, vibration and harshness from the chain and pulley assemblies, chain guides are employed. For example, chain guides are typically positioned in the two regions where the chain spans between a pair of pulleys. During the manufacturing of the CVTs, guide pins may be employed to aid in the assembly of the chain guides in the CVTs Accordingly, there is a need for a guide pin assembly that facilitates high volume production of CVTs with the chain guides.

SUMMARY

The present invention provides a guide pin assembly for a CVT variator. The guide pin assembly includes a retainer and a guide pin coupled to the retainer. The retainer is also coupled to a housing portion of the CVT with an attachment mechanism such as, for example, a bolt. The retainer provides at least three functions for the guide pin: pilot, orientation and retention. The guide pin provides lateral and axial constraints to a chain guide through which a chain extends.

Further features, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 1 is a perspective view of a chain and pulley assembly for a CVT in accordance with the principles of the present invention;

FIG. 5 is a close-up view of a single guide pin assembly; and

FIG. 6 is a close-up view of a guide pin of the single guide pin assembly.

DETAILED DESCRIPTION

The following description is merely exemplary in nature and is not intended to limit the present disclosure, application, or uses.

Figure 2:
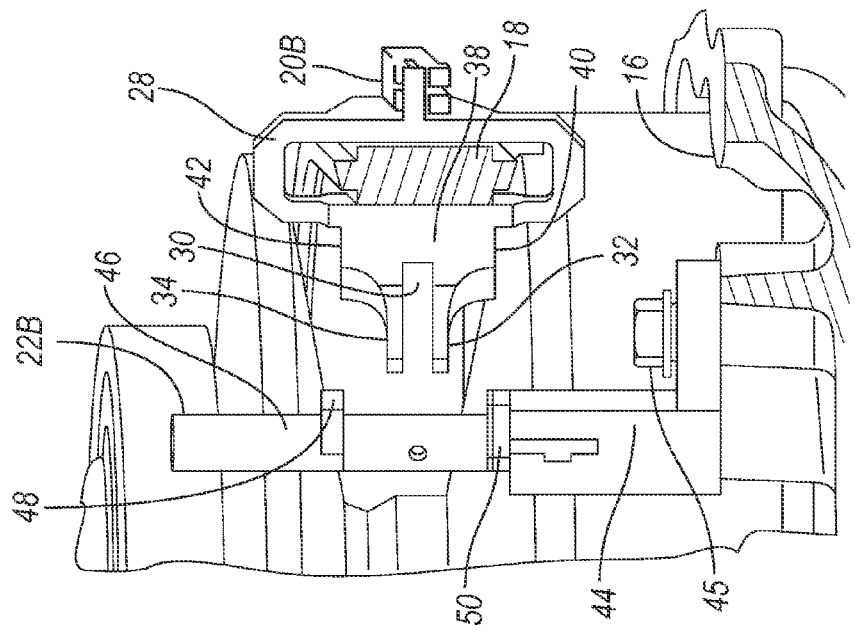
FIG. 2A is a top view of the chain and pulley assembly shown in FIG. 1.
FIG. 2B is a close-view of a chain guide and guide pin assembly for the chain and pulley assembly shown in FIGS. 1 and 2A.
FIG. 2C is a partial cross-sectional view of the chain guide and guide pin assembly shown in FIG. 2B.

Referring now to the drawings, a chain and pulley assembly for a CVT embodying the principles of the present invention is illustrated in FIGS. 1 and 2A and designated at 10. The assembly 10 includes a pair of pulleys 12 and 14 rotationally coupled to a housing portion 16. A chain 18 encircles the pulleys 12 and 14 such that rotation of one pulley results in the rotation of the other pulley. A pair of chain guides 20A and 20B are positioned between the pulleys 12 and 14 and couple with respective guide pin assemblies 22A and 22B.

Each chain guide 20A and 20B includes a sleeve 28 (FIGS. 2B and 2C) through which the chain 18 extends. When the assembly 10 is being assembled together, certain amount of slack in the chain 18 allows the chain 18 and the chain guides 20A and 20B to move away from the pulleys 12 and 14 as indicated by the arrows 24. Each chain guide 20A and 20B includes a block portion 38 connected to the sleeve 28. A pair of spaced apart U-shaped extensions 34 and 32 extends from a top section 42 and a bottom section 40 of the block portion 38, respectively, towards respective guide pin assemblies 22A and 22B. Each U-shaped extension 32 and 34 includes an interior 30 that defines a cutout region 36. The cutout region 36 engages with a respective guide pin assembly 22A and 22B during the assembly process as the chain guides 20A and 20B are directed towards the guide pin assemblies 22A and 22B as indicated by the arrows 26, thereby, restraining inward lateral movement of the chain guides 20A and 20B.

Figure 3:
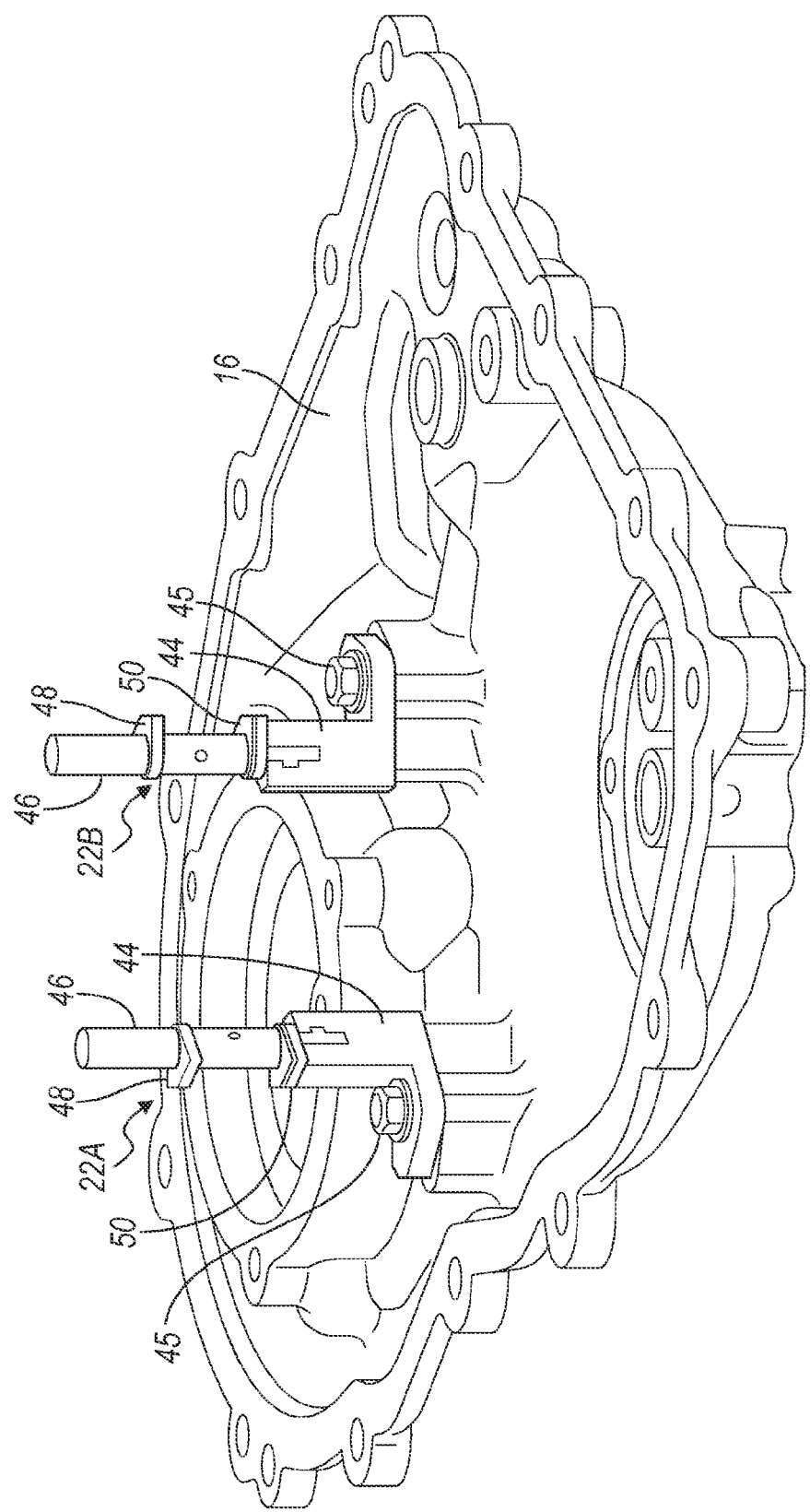
FIG. 3 is a perspective view of a pair of guide pin assemblies attached to a housing portion of the CVT.
Figure 4:
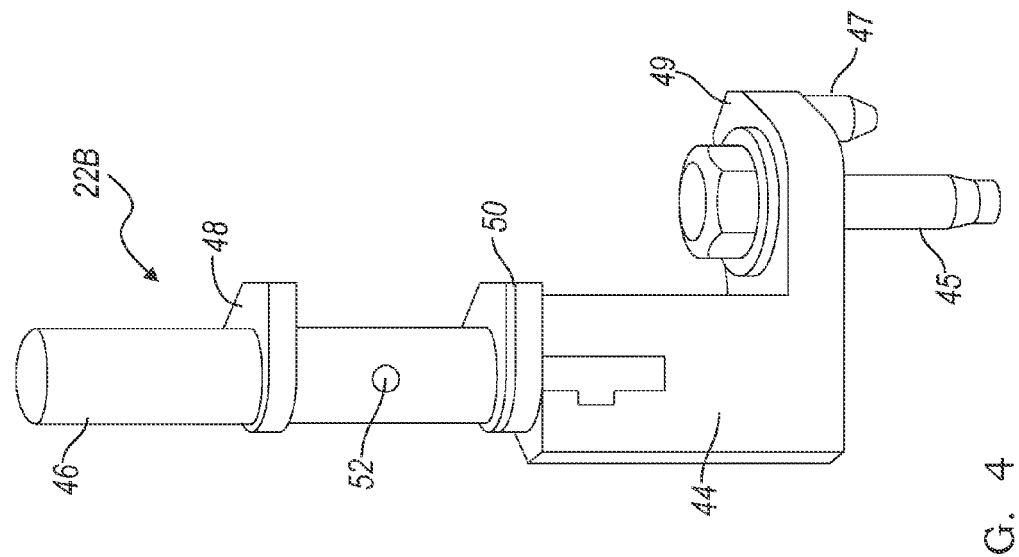
FIG. 4 is a perspective view of the pair of guide pin assemblies.
Figure 4:
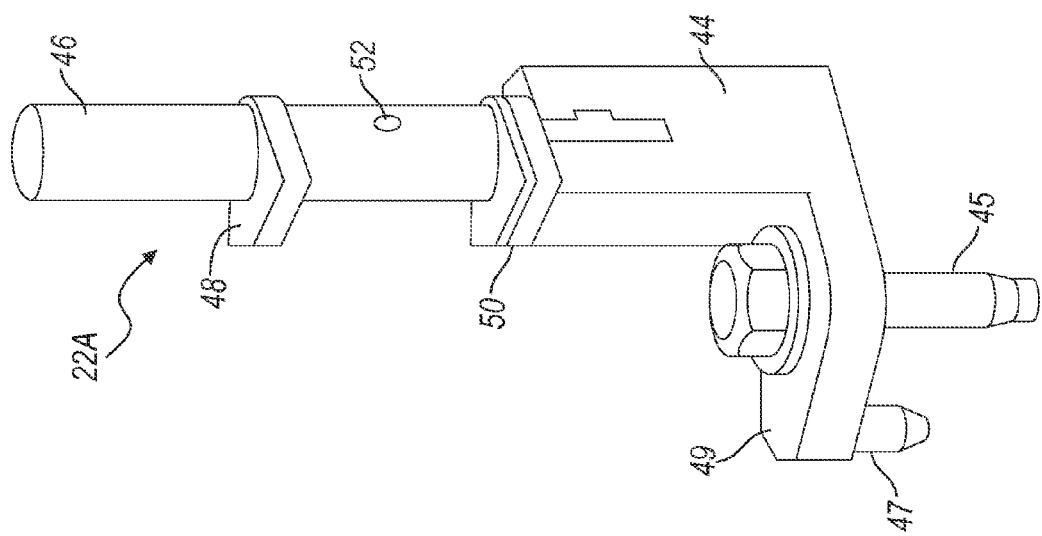

Referring also to FIGS. 3 and 4, each guide pin assembly 22A and 22B includes a retainer 44 and a guide pin 46 that is coupled to the retainer 44. The retainer 44 includes a flange portion 49 through which a bolt 45 extends to attach the retainer 44 to the housing portion 16. The guide pin 46 includes a top axial stop 48 and a bottom axial stop 50 spaced apart from the top axial stop 48.

When assembled, each guide pin 46 resides in the cutout region 36 of a respective chain guide 20A and 20B. Engagement between the guide pins 46 and the chain guides 20A and 20B prevent further lateral movement of the chain guides 20A and 20B during the manufacturing process of the assembly 10 as well during the operation of the assembly 10. Further, engagement between the top axial stop 48 and the top U-shaped extension 34 and engagement between the bottom axial stop 50 and the bottom U-shaped extension 32 limits the up and down axial movement of the chain guides 20A and 20B, that is, movement of each chain guide 20A and 20B parallel to the longitudinal axis of each guide pin 46. Hence, during the operation of the assembly 10, axial movement of the chain guides 20A and 20B, and hence the chain 18, is limited by the axial stops 48 and 50 of the guide pins 46, inward lateral movement of the chain guides 20A and 20B and the chain 18 is limited by the engagement between the chain guides 20A and 20B and the guide pins 46, and outward lateral movement of the chain guides 20A and 20B and the chain 18 is limited by the tension of the chain 18.

Referring specifically to FIG. 4, each retainer 44 includes a guide stub 47 that extends from the bottom of the flange portion 49 into the housing portion 16 such that together with the bolts 45 ensure proper orientation of the retainer 44 with respect to the housing portion 16. One or both guide pins 46 can include a feed 52 that provides lubrication, such as, for example, oil, to the chain 18 and the pulleys 12 and 14.

Referring now to FIGS. 5 and 6, each guide pin 46 includes semi-circular regions 54 and 55, a tab 56 and a cylindrical region 58. The cylindrical region acts 58 as a pilot pin to guide the guide pin 46 into a bore of the retainer 44 when the guide pin 46 and the retainer 44 are being coupled together. The semi-circular regions 54 and 55 allow rotational movement of the guide pin 46 about the longitudinal axis of the guide pin 46 and within the bore of the retainer 44 for proper orientation of the axial stops 48 and 50. After the guide pin 46 has been properly positioned and orientated, the tab 56 is engaged with a notch 60 within the bore of the retainer 44 which prevents the de-coupling of the guide pin 46 from the retainer 44, that is, provides retention of the guide pin 46 within the retainer 44. Note that dampening material 51 may be placed in the housing portion 16 beneath the retainer 44 to limit the transmission of vibrations between the guide pin assemblies 22A and 22B and the housing portion 16.

The description of the invention is merely exemplary in nature and variations that do not depart from the gist of the invention are intended to be within the scope of the invention. Such variations are not to be regarded as a departure from the spirit and scope of the invention.

What is claimed is:

1. A guide pin assembly for a continuously variable transmission (CVT) comprising:
   a guide pin; and
   a retainer coupled to the guide pin,
   wherein the guide pin includes a pair of semi-circular regions, a tab and a cylindrical region, the semicircular regions allowing rotational movement of the guide pin within the retainer about a longitudinal axis of the guide pin to ensure proper orientation of the guide pin, and
   wherein the retainer provides pilot, orientation and retention of the guide pin.

2. The assembly of claim 1 wherein the guide pin provides lateral and axial constraints to a chain guide through which a chain extends.

3. The assembly of claim 2 wherein the guide pin engages with a pair of U-shaped extensions of the chain guide to constrain lateral movement of the chain guide in a first direction.

4. The assembly of claim 3 wherein tension in the chain constrains lateral movement of the chain guide in a second direction opposite the first direction.

5. The assembly of claim 2 wherein the guide pin includes a pair of spaced apart axial stops to constrain axial movement of the chain guide parallel a longitudinal axis of the guide pin.

6. The assembly of claim 1 wherein the guide pin includes a feed to provide lubrication to the chain.

7. The assembly of claim 1 wherein the cylindrical region acts as the pilot to guide the guide pin into a bore of the retainer.

8. The assembly of claim 1 wherein the tab provides retention of the guide pin within the retainer.

9. The assembly of claim 1 wherein the retainer includes a guide stub extending from the bottom of the retainer into a housing portion of the CVT.

10. The assembly of claim 9 wherein the retainer is coupled to the housing portion with a bolt.

11. The assembly of claim 10 wherein the bolt and the guide stub ensure proper orientation of the retainer with respect to the housing portion.

12. A chain and pulley assembly for a continuously variable transmission (CVT) comprising:
   a housing;
   a first pulley rotationally coupled to the housing;
   a second pulley rotationally coupled to the housing and spaced apart from the first pulley;
   a chain engaged with and encircling the first and second pulleys such that rotation of one of the pulleys results in the rotation of the other pulley;
   a pair of chain guides, the chain guides spaced apart and positioned in a region between the first and second pulleys, each chain guide including a sleeve through which the chain extends; and
   and a pair of guide pin assemblies, each guide pin assembly providing axial and lateral constraints of a respective chain guide, each guide pin assembly including a guide pin and a retainer coupled to the guide pin, each guide pin including a pair of semi-circular regions, a tab and a cylindrical region, the semicircular regions allowing rotational movement of the guide pin within the retainer about a longitudinal axis of the guide pin to ensure proper orientation of the guide pin, the retainer providing pilot, orientation and retention of the guide pin.

13. The assembly of claim 12 wherein each guide pin engages with a pair of U-shaped extensions of the chain guide to constrain lateral movement of the chain guide.

14. The assembly of claim 12 wherein each guide pin includes a pair of spaced apart axial stops to constrain axial movement of the chain guide parallel a longitudinal axis of the guide pin.

15. The assembly of claim 12 wherein the cylindrical region acts as the pilot to guide the guide pin into a bore of the retainer.

16. The assembly of claim 12 wherein the tab provides retention of the guide pin within the retainer.

* * * * *